United States Patent
Hirano et al.

(10) Patent No.: US 8,773,796 B2
(45) Date of Patent: Jul. 8, 2014

(54) SYSTEM AND METHOD OF SYNCHRONIZED WRITING ON BIT PATTERNED MEDIA WITH READ-WRITE OFFSET

(75) Inventors: Toshiki Hirano, San Jose, CA (US); Xiaotian Sun, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 300 days.

(21) Appl. No.: 13/204,360

(22) Filed: Aug. 5, 2011

(65) Prior Publication Data
US 2013/0033777 A1    Feb. 7, 2013

(51) Int. Cl.
*G11B 5/09*    (2006.01)

(52) U.S. Cl.
USPC .......................................................... 360/51

(58) Field of Classification Search
None
See application file for complete search history.

(56) References Cited

U.S. PATENT DOCUMENTS

| | | | |
|---|---|---|---|
| 6,738,207 B1 | 5/2004 | Belser et al. | |
| 7,492,540 B2 | 2/2009 | Albrecht | |
| 7,675,699 B2 | 3/2010 | Albrecht | |
| 7,848,047 B2 * | 12/2010 | Albrecht | 360/75 |
| 7,848,048 B1 | 12/2010 | Albrecht et al. | |
| 2006/0119965 A1 | 6/2006 | Ohno | |
| 2009/0237829 A1 | 9/2009 | Ozawa et al. | |
| 2010/0073801 A1 | 3/2010 | Itakura | |
| 2010/0142076 A1 | 6/2010 | Bandic et al. | |
| 2010/0142077 A1 | 6/2010 | Zaitsu et al. | |
| 2010/0202079 A1 | 8/2010 | Buch et al. | |
| 2010/0238577 A1 | 9/2010 | Mutoh | |
| 2010/0238578 A1 | 9/2010 | Ueno | |

FOREIGN PATENT DOCUMENTS

| | | |
|---|---|---|
| JP | 2004199806 A | 7/2004 |
| JP | 2009245488 A | 10/2009 |

OTHER PUBLICATIONS

Tang, Yawshing, "Write Synchronization in Bit-Patterned Media", IEEE Transactions on Magnetics, vol. 45, No. 2, Feb. 2009, Samsung Information Systems America, San Jose, CA; pp. 822-826.

* cited by examiner

*Primary Examiner* — Daniell L Negron

(57) ABSTRACT

A system and method of establishing write timing in a disk drive using bit patterned media and a magnetic head with read-write offset in which servoing and writing occur on different tracks with timing offsets. Initially, the distance between the servoing and writing tracks is determined for each track/head position in accordance with head geometry and skew angle. The relative timing errors are then measured by iteratively writing data at timing offset increments to determine the optimal timing offset for the servoing/writing track pair, and then writing the offset to sync fields on the servoing tracks of the disk.

17 Claims, 3 Drawing Sheets

SYSTEM AND METHOD OF SYNCHRONIZED WRITING ON BIT PATTERNED MEDIA WITH READ-WRITE OFFSET

BACKGROUND OF THE INVENTION

1. Field of the Disclosure

The present invention relates in general to disk drives and, in particular, to a system, method and apparatus for synchronizing writing on bit patterned media.

2. Description of the Related Art

In some disk drives with bit patterned media, there is an offset of a few micrometers between the read head and the write head. The read head provides a timing reference using the patterns on the servoing track. Due to the nature of the pattern generation process between the inner and outer diameters of the disk, the regularity of the patterns is not consistent over the range of the read-write offset. This creates a problem for synchronizing the write signal with the patterns on the write track.

Conventional solutions to this problem include measuring the phase difference between the write and read tracks on the master disk, and storing this information in a look-up table in memory. A similar process determines the optimal write phase with a different method and stores it in memory. Still another solution measures the write phases for track groups and stores the information as a look-up table. The look-up table may be stored in a single, dedicated section of the media. However, in use, the look-up table must first be read into memory. Thus, continued improvements in synchronizing writing on bit patterned media are desirable.

SUMMARY

Embodiments of a method for synchronizing writing on bit patterned media are disclosed. For example, a method for synchronizing writing in a disk drive may comprise providing the disk drive with a disk having bit patterned media, and a slider with a read head and a write head for reading data from and writing data to the disk, respectively. The method may further comprise positioning the read head at a read-write offset with respect to the write head; writing data with the write head onto a data pattern on a write track of the bit patterned media; providing a timing offset between the data pattern on the write track and a data pattern on a servoing track of the bit patterned media with the read head using the data pattern on the servoing track; storing the timing offset in a plurality of sync fields in a plurality of servo sectors on the servoing track; reading back the timing offset stored in the sync fields with the read head; and synchronizing a write signal of the data pattern on the write track with the timing offset read back from the sync fields.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
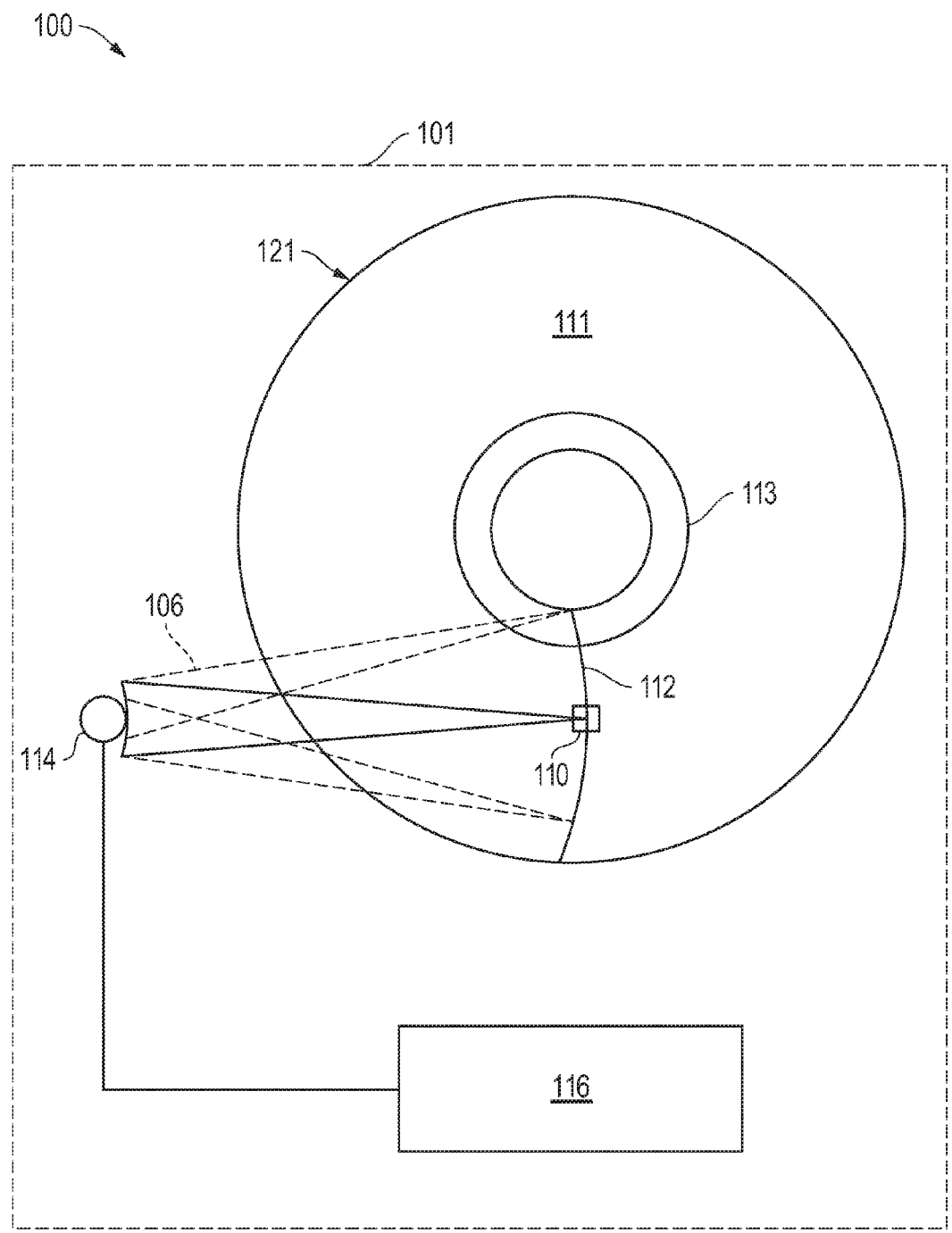
FIG. 1 is schematic plan view of an embodiment of a disk drive.

Embodiments of a system, method and apparatus for synchronizing writing on bit patterned media are disclosed. FIG. 1 depicts a hard disk drive assembly 100 comprising a housing or enclosure 101 with one or more media disks 111 rotatably mounted thereto. The disk 111 comprises magnetic recording media rotated at high speeds by a spindle motor (not shown) during operation. Concentric magnetic data tracks 113 are formed on either or both of the disk surfaces to receive and store information.

Embodiments of a read/write slider 110 may be moved across the disk surface by an actuator assembly 106, allowing the slider 110 to read and/or write magnetic data to a particular track 113. The actuator assembly 106 may pivot on a pivot 114. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write heads 110 periodically reference servo patterns recorded on the disk to ensure accurate slider 110 positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. Unlike spokes however, servo sections 112 form a subtle, arc-shaped path calibrated to substantially match the range of motion of the read/write slider 110.

Figure 2:
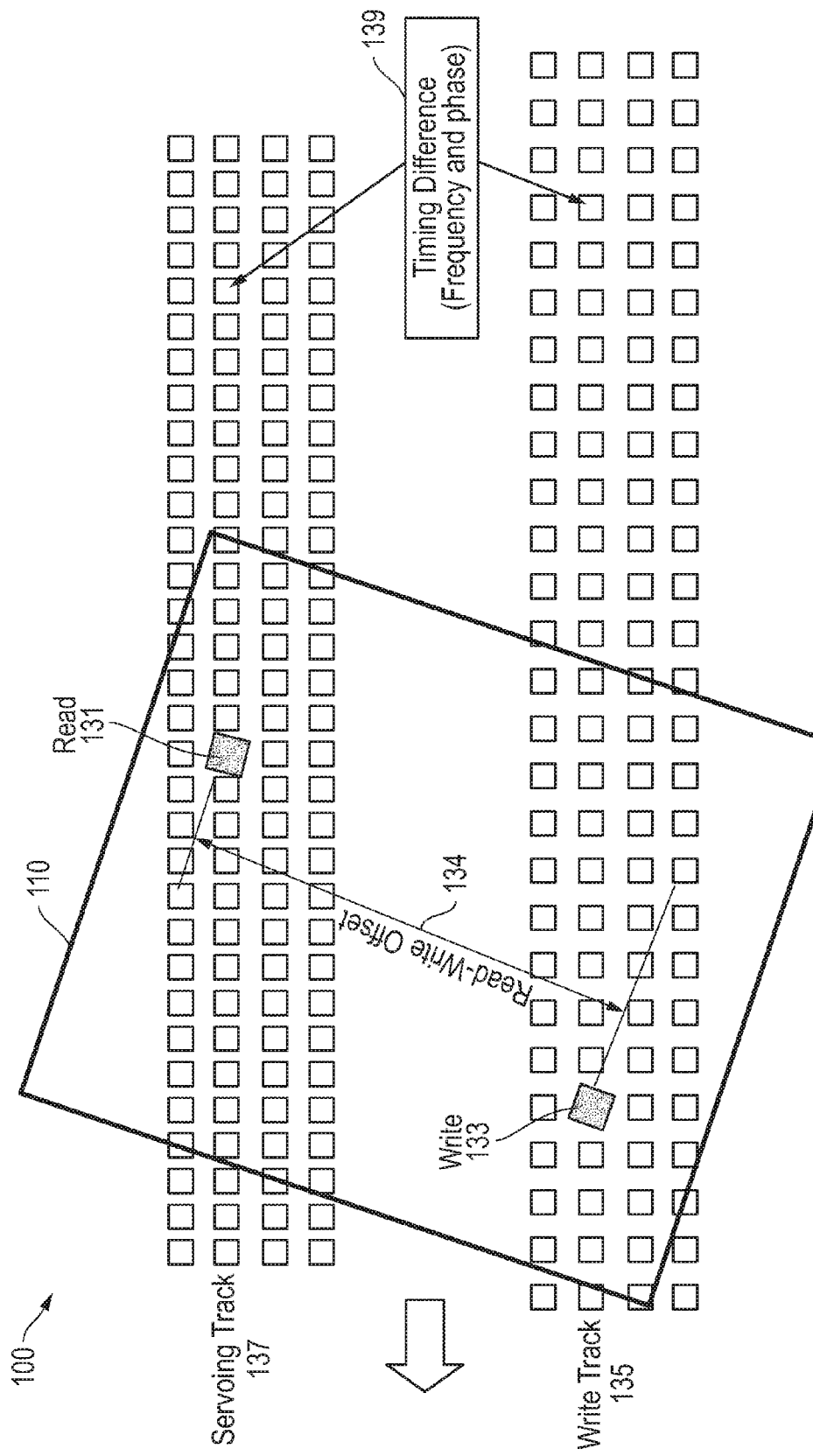
FIG. 2 is an enlarged schematic view of an embodiment of a portion of a disk and slider in a disk drive during operation.

In some embodiments, a method for synchronizing writing in a disk drive comprises providing the disk drive with a disk having bit patterned media, and the slider 110 with a read head 131 (FIG. 2) and a write head 133 for reading data from and writing data to the disk, respectively. The method further comprises positioning the read head 131 at a read-write offset 134 with respect to the write head 133; writing data with the write head 133 onto a data pattern on a write track 135 of the bit patterned media (the read-write offset 134 may be on the order of, e.g., a few micrometers).

The method further comprises providing a timing offset 139 between the data pattern on the write track 135 and a data pattern on a servoing track 137 of the bit patterned media with the read head 131 using the data pattern on the servoing track 137. The timing offset may comprise differences in frequency and phase. The method may further comprise storing the timing offset 139 in a plurality of sync fields 141 (FIG. 3) in a plurality of servo sectors 143 on the servoing track; reading back the timing offset 139 stored in the sync fields 141 with the read head 131; and synchronizing a write signal of the data pattern on the write track 135 with the timing offset 139 read back from the sync fields 141. These steps may be performed directly from the sync fields without memory storage.

The method may further comprise adjusting a frequency and phase of a clock of the disk drive with the timing offset stored in the sync fields. In still other embodiments, the method further comprise initially adjusting a clock of the disk drive to synchronize the write signal to a timing of the data pattern on the servoing track, since the slider is skewed relative to the bit patterned media.

Figure 3:
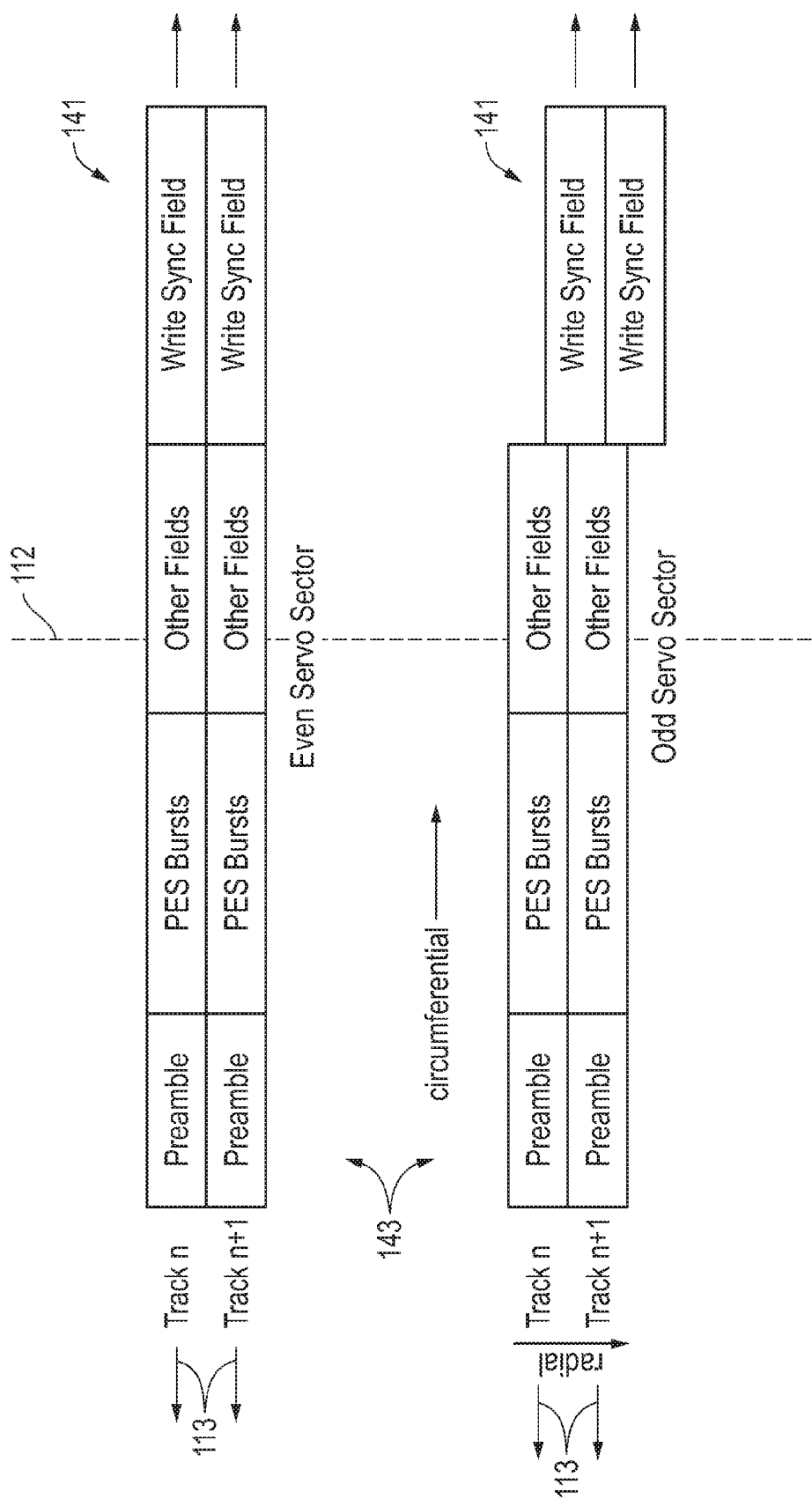
FIG. 3 is an enlarged schematic view of an embodiment of another portion of a disk in a disk drive.

As shown in FIG. 3, the sync fields 141 may be radially positioned with about half-track offsets in circumferentially alternating servo sectors (e.g., in even numbered and odd numbered sectors) to accommodate varying read-write offsets. This allows the timing offset stored in the sync fields to still be read back by the reader that is not positioned at the center of the servoing track, while the writer is positioned at the center of the write track. The read-write offsets vary with the skewed head due to geometric parameters and radial location of the head relative to the disk.

Normally the reader can read back the data stored on the track when the reader is positioned within +/−50% track pitch of the track center. However, for the writer, it needs to be positioned within roughly +/−10-15% track pitch of the track center. The effective read-write offset is usually not an integer-multiple of the track pitch. In addition, the effective read-write offset changes with the skew angle. Thus, when the writer is centered on the write track, the reader is probably not centered on the servoing track. By having the sync fields that are radially positioned by ½ track offset, there will always be a sync fields within ½ track from the reader to successfully read back the data stored in it.

In still other embodiments, the method comprises measuring an optimal timing offset by writing at different timing offsets, each incremented by a step between the servo sectors. The optimal timing offset may be determined by reading back the written data and measuring bit error rates in the written data, such that the timing offset corresponding to the smallest bit error rate is the optimal timing offset. Each servo sector may contain one sync field, and then store the optimal timing offset between the servoing track and the write track of the sync field as described herein. The optimal timing offset may be written in the plurality of sync fields on the plurality of servo sectors in a plurality of servoing tracks.

Embodiments of a disk drive may comprise a disk having bit patterned media, and a slider with a read head and a write head for reading data from and writing data to the disk, respectively; the read head is spaced part from the write head at a read-write offset; a data pattern on a write track of the bit patterned media; a data pattern on a servoing track of the bit patterned media; a timing offset between the data pattern on the write track and the data pattern on the servoing track; a plurality of sync fields in a plurality of servo sectors on the servoing track for storing the timing offset; and a write signal of the data pattern on the write track is synchronized with the timing of the data pattern on the servoing track, adjusted by the timing offset read back from the sync fields.

Advantages include storing phase differences in a field inside the servo sector on the read track. Each servo sector can potentially have a different optimal write phase correction. Thus, no look-up tables are used as the optimal write phase for each servo sector is stored in a field inside that servo sector. In addition, the reference timing may be generated by data islands on the read track. Furthermore, the sync fields may be radially offset by half of a track in alternating servo sectors to accommodate variation in read-write offset and changing skew angle of the slider relative to the tracks.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for synchronizing writing in a disk drive, comprising:
   providing the disk drive with a disk having bit patterned media, and a slider with a read head and a write head for reading data from and writing data to the disk, respectively;
   positioning the read head at a read-write offset with respect to the write head;
   writing data with the write head onto a data pattern on a write track of the bit patterned media;
   providing a timing offset between the data pattern on the write track and a data pattern on a servoing track of the bit patterned media with the read head using the data pattern on the servoing track;
   storing the timing offset in a plurality of sync fields in a plurality of servo sectors on the servoing track, wherein the sync fields are radially positioned with about half-track offsets in circumferentially alternating servo sectors to accommodate varying read-write offsets;
   reading back the timing offset stored in the sync fields with the read head; and
   synchronizing a write signal of the data pattern on the write track with the timing offset read back from the sync fields.

2. A method according to claim 1, further comprising initially adjusting a clock of the disk drive to synchronize the write signal to a timing of the data pattern on the servoing track.

3. A method according to claim 1, wherein the timing offset stored in the sync fields is used to further adjust a clock of the disk drive.

4. A method according to claim 1, wherein the timing offset comprises adjusting a frequency and phase of a clock of the disk drive with the timing offset stored in the sync fields.

5. A method according to claim 1, wherein the slider is skewed relative to the bit patterned media.

6. A method according to claim 1, wherein an optimal timing offset is measured by writing at different timing offsets, each incremented by a step between the servo sectors.

7. A method according to claim 6, wherein the optimal timing offset is determined by reading back the written data and measuring bit error rates, and the timing offset corresponding to a smallest bit error rate is the optimal timing offset.

8. A method according to claim 7, wherein each servo sector contains one sync field, and storing the optimal timing offset in the plurality of sync fields in the plurality of servo sectors on the servoing track.

9. A method according to claim 8, wherein the optimal timing offset is written in the plurality of sync fields on the plurality of servo sectors in a plurality of servoing tracks.

10. A method for synchronizing writing in a disk drive, comprising:
    providing the disk drive with a disk having bit patterned media, and a slider with a read head and a write head for reading data from and writing data to the disk, respectively;
    positioning the read head at a read-write offset with respect to the write head;
    writing data with the write head onto a data pattern on a write track of the bit patterned media;
    providing a timing offset between the data pattern on the write track and a data pattern on a servoing track of the bit patterned media with the read head using the data pattern on the servoing track;
    storing the timing offset in a plurality of sync fields in a plurality of servo sectors on the servoing track;
    reading back the timing offset stored in the sync fields with the read head;
    synchronizing a write signal of the data pattern on the write track with the timing offset read back from the sync fields;
    adjusting a clock of the disk drive with the timing offset stored in the sync fields; and
    measuring an optimal timing offset by writing at different timing offsets, each incremented by a step between the servo sectors.

11. A method according to claim 10, further comprising initially adjusting the clock of the disk drive to synchronize the write signal to a timing of the data pattern on the servoing track.

12. A method according to claim 10, wherein the timing offset comprises differences in frequency and phase.

13. A method according to claim 10, wherein the slider is skewed relative to the bit patterned media.

14. A method according to claim 10, wherein the sync fields are radially positioned with about half-track offsets in circumferentially alternating servo sectors to accommodate varying read-write offsets.

15. A method according to claim 10, wherein the optimal timing offset is determined by reading back the written data and measuring bit error rates, and the timing offset corresponding to a smallest bit error rate is the optimal timing offset.

16. A method according to claim 15, wherein each servo sector contains one sync field, and storing the optimal timing offset in the plurality of sync fields in the plurality of servo sectors on the servoing track.

17. A method according to claim 16, wherein the optimal timing offset is written in the plurality of sync fields on the plurality of servo sectors in a plurality of servoing tracks.

* * * * *